(No Model.)  
6 Sheets—Sheet 1.
L. S. CRANDALL.
TYPE WRITING MACHINE.
No. 548,157. Patented Oct. 15, 1895.
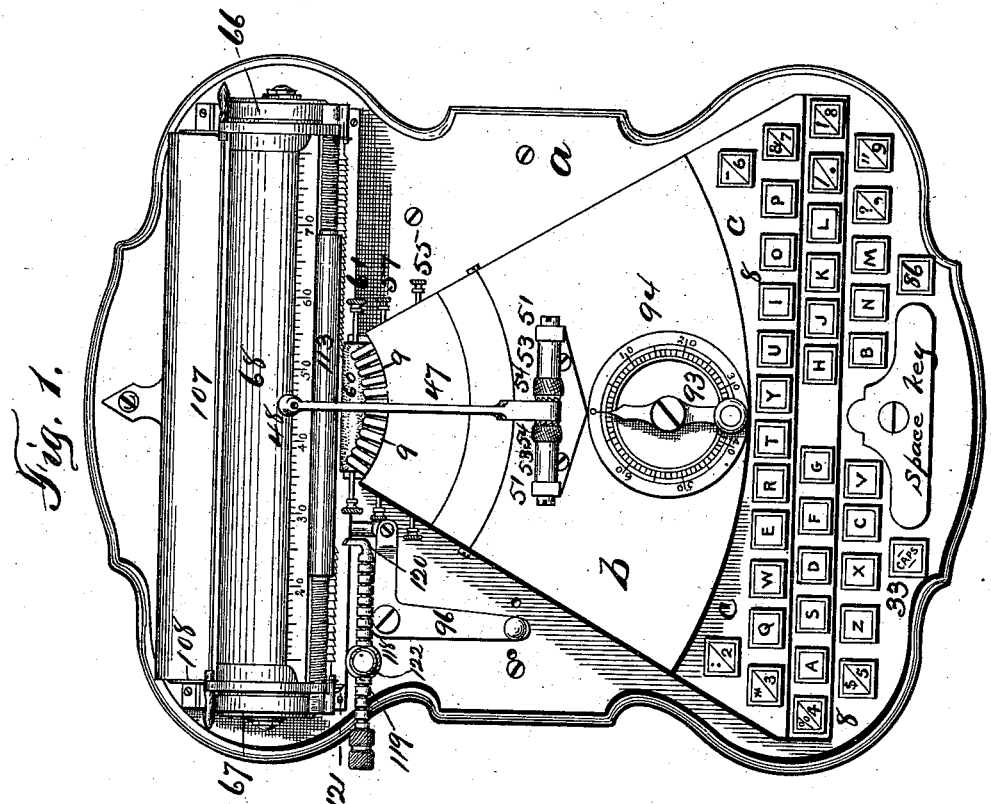
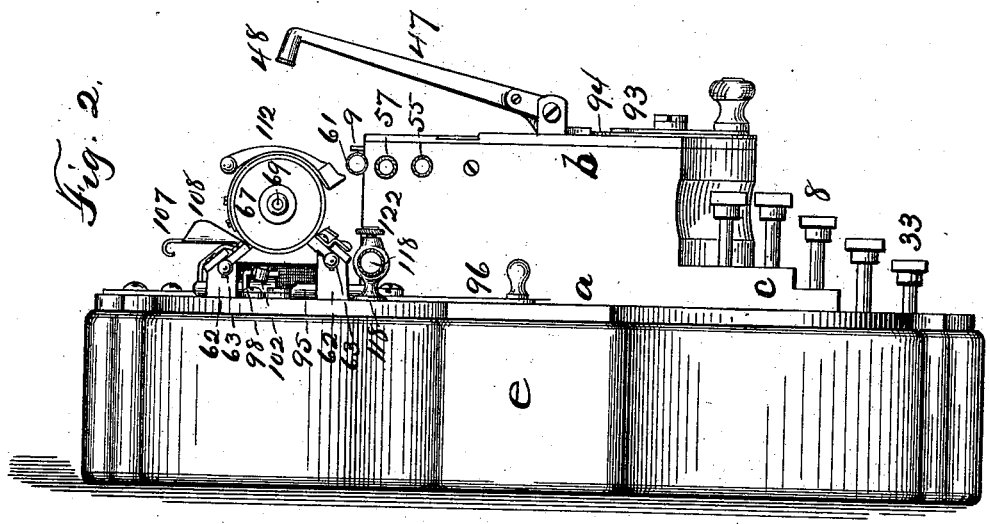

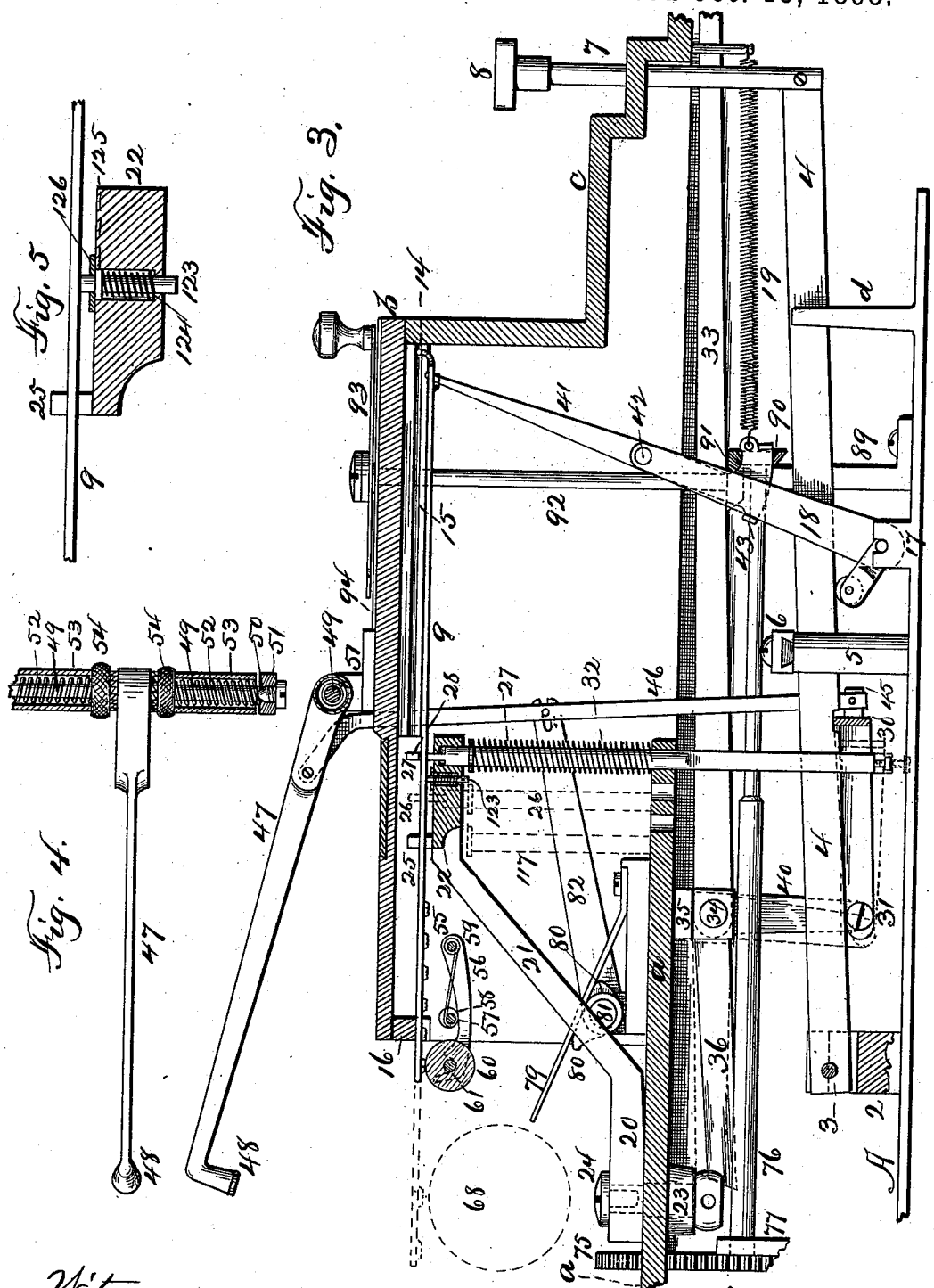

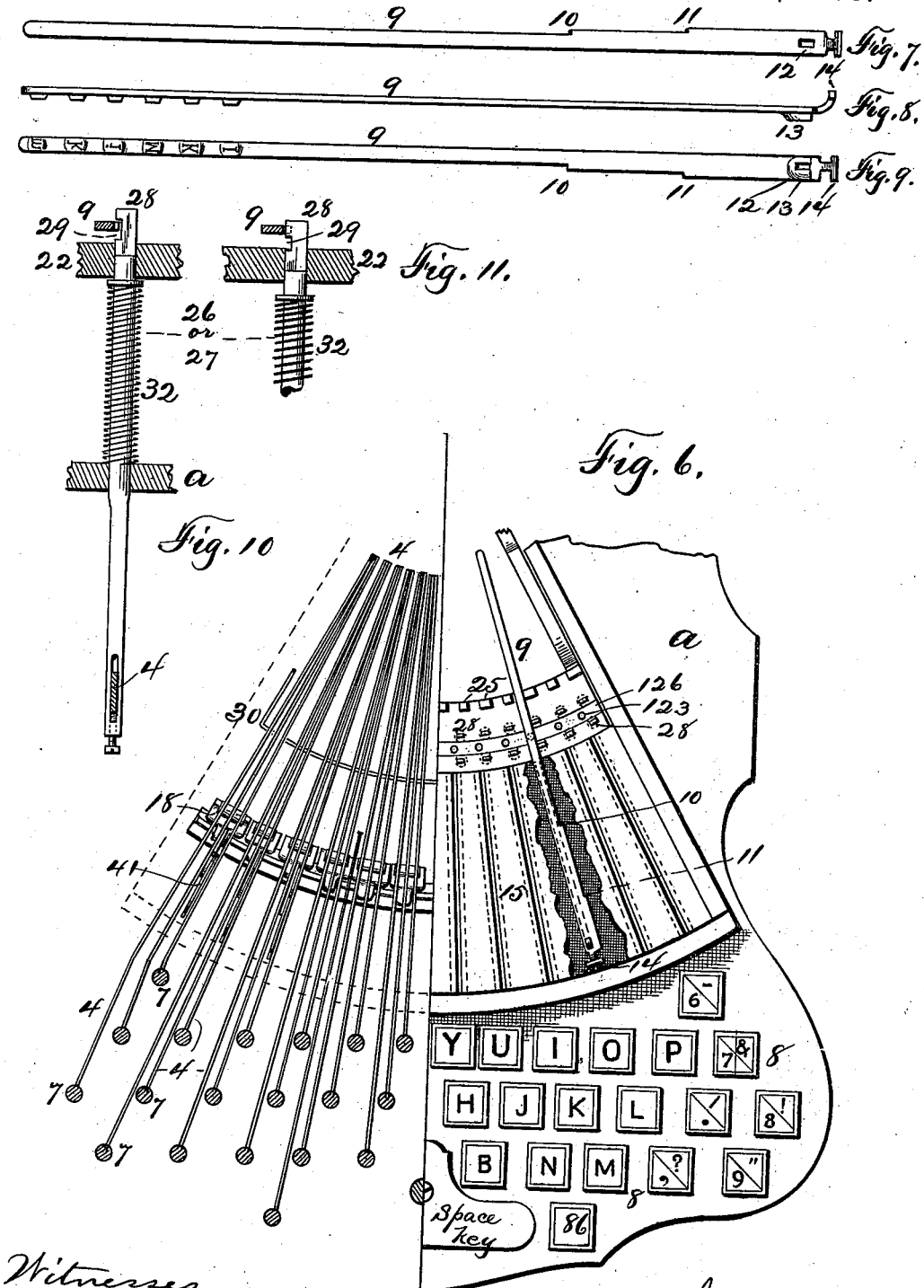

(No Model.) 6 Sheets—Sheet 4.
L. S. CRANDALL.
TYPE WRITING MACHINE.
No. 548,157. Patented Oct. 15, 1895.
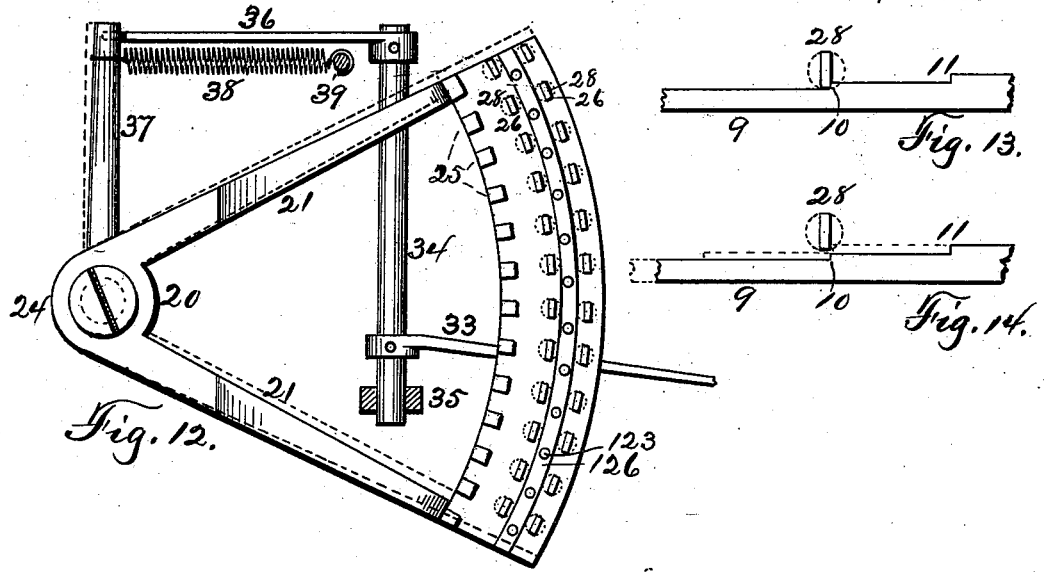
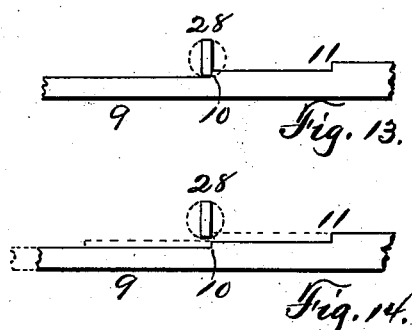
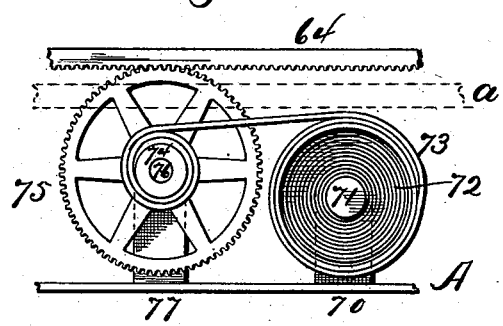
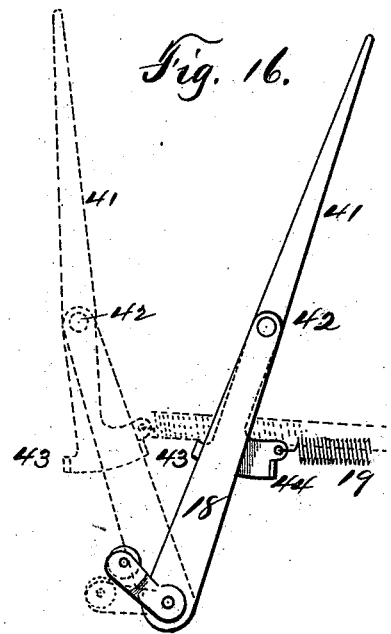
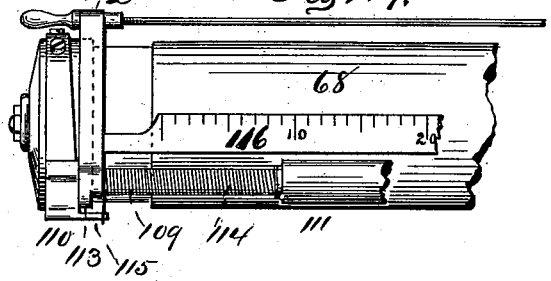
Witnesses
Charles W. Marvin.
O. S. Borst
Inventor
Lucien S. Crandall
By Smith & Denison
his Attorneys (No Model.) 6 Sheets—Sheet 5.
L. S. CRANDALL.
TYPE WRITING MACHINE.
No. 548,157. Patented Oct. 15, 1895.
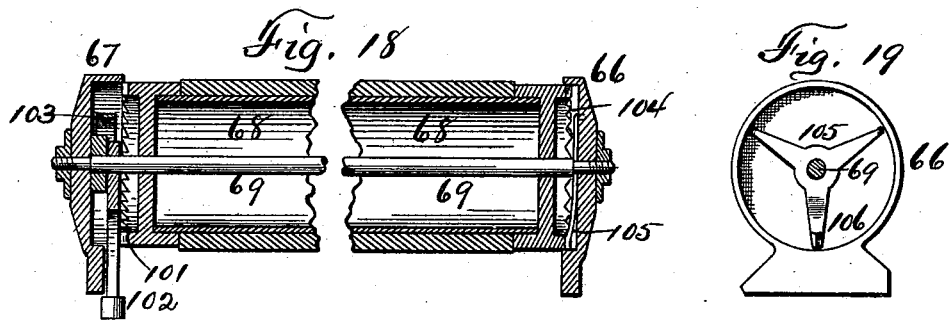
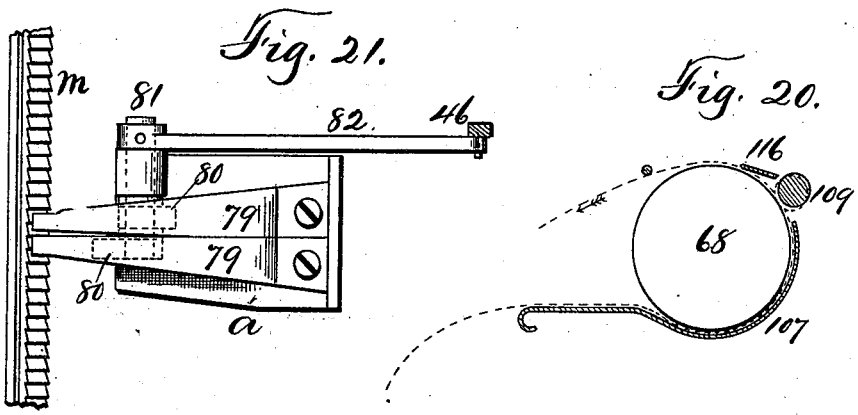
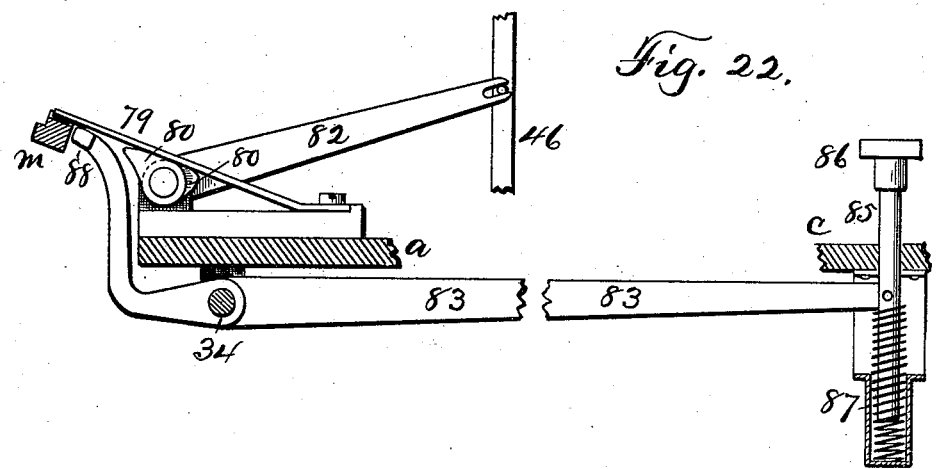

(No Model.) 6 Sheets—Sheet 6.
L. S. CRANDALL.
TYPE WRITING MACHINE.
No. 548,157. Patented Oct. 15, 1895.
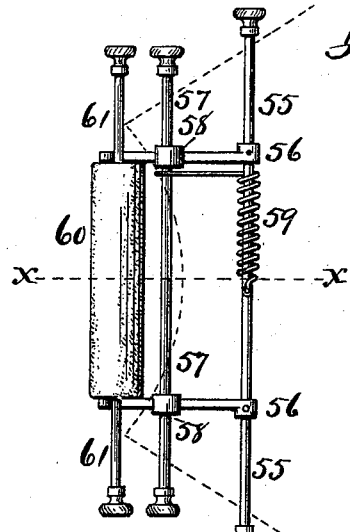
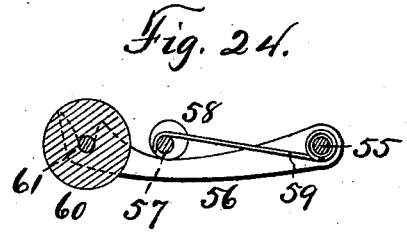
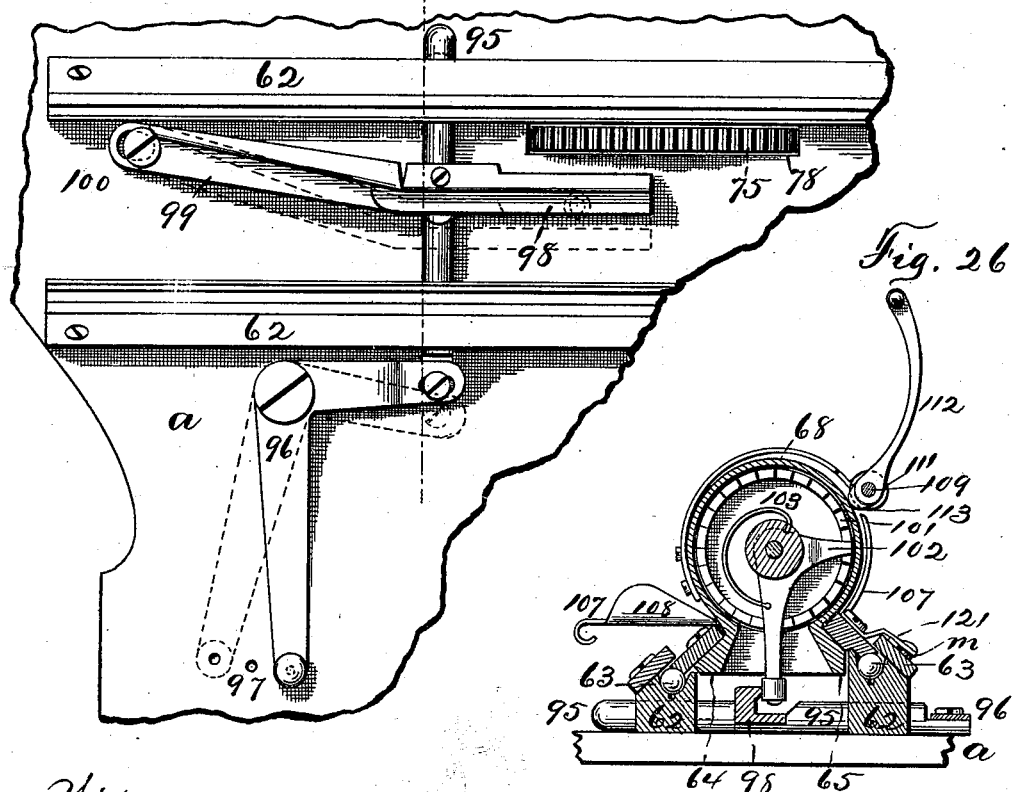
Witnesses
Charles W. Marvin
E. S. Borst
Inventor
Lucien S. Crandall
By Smith & Denison
his Attorneys

United States Patent Office.

LUCIEN S. CRANDALL, OF PARISH, ASSIGNOR OF ONE-FOURTH TO JACOB W. RIGLANDER, OF NEW YORK, N. Y.

TYPE-WRITING MACHINE.

SPECIFICATION forming part of Letters Patent No. 548,157, dated October 15, 1895.

Application filed October 1, 1894. Serial No. 524,543. (No model.)

*To all whom it may concern:*

Be it known that I, LUCIEN S. CRANDALL, of Parish, in the county of Oswego, in the State of New York, have invented new and useful Improvements in Type-Writing Machines, of which the following, taken in connection with the accompanying drawings, is a full, clear, and exact description.

My invention relates to type-writing machines, and particularly to that class in which the writing is always exposed to view.

My object is to produce a type-writing machine in which the printing is made upon the top of the impression-platen by means of horizontally-reciprocating type-bars, an inking-roller, and an impression-hammer, each type-bar being provided with six (or more or less) characters, signs, or symbols, part upper case and part lower case, said type-bars being arranged upon lines radial to the printing-point and converging thereat, each one being projected by the operation of a key-lever variable distances for the three small letters adjacent to its outer end, and then by operating a shift-key is adapted to be projected farther for the printing of the three capitals thereon, respectively, means being provided to properly stop each type-bar at the printing-point, comprising a system of stops actuated by the key-levers, in which an interval exists between the moment when the type-bar reaches the desired point of projection and when the hammer strikes the impression blow thereon; in which a lever in the keyboard is operated to release the carriage from the escapement mechanism; in which a crank-lever is operated to throw the carriage back at the end of a line or set it at any desired point, either independently of or in conjunction with said release-lever; in which a track and switch are adjustably mounted upon the bed-plate, and by the engagement with said switch of a vibrating arm pendent from an oscillatory pawl engaging with a rack upon the platen said platen is automatically rotated for line-spacing whether the carriage is thrown back by hand or by means of the crank-lever aforesaid, and in which means are provided whereby the downward movement of each finger, key, and lever is always the same, although it is adapted to project the type-arms to which it is connected variable distances, and in which there are other novel elements and combination of elements for doing and performing different things, purposes, and functions.

My invention consists in the several novel features of construction and operation hereinafter described and which are specifically set forth in the claims hereunto annexed.

It is constructed as follows, reference being had to the accompanying drawings, in which—

Figure 1 is a top plan of the machine. Fig. 2 is a side elevation thereof. Fig. 3 is a sectional elevation thereof, detailing a single key-lever, type-bar, and the intermediate connections; also the sway-bar shifting mechanism, stop mechanism, and the shafts and gearing for retracting and setting the platen. Fig. 4 is a sectional detail of the hammer-mounting. Fig. 5 is a sectional detail of a type-bar and a tappet yieldingly supporting it. Fig. 6 is a top plan showing on one side part of the keys or finger-buttons and the grooves and stops of the type-bars with one type-bar, all in top plan, and on the other side showing the mounting of the key-levers. Fig. 7 is a top plan of a type-bar. Fig. 8 is a side elevation thereof. Fig. 9 is a bottom plan thereof. Fig. 10 is a sectional elevation showing a stop in its normal position with relation to a type-bar. Fig. 11 is a like view showing the stop depressed to stop the type-bar. Fig. 12 is a top plan of the sway-bar and the mechanism for shifting it, as shown by the dotted lines, to change the printing from small letters to capitals. Fig. 13 is a top plan of a type-bar and a stop, showing them in their normal positions, as for printing small letters or lower case. Fig. 14 is a like view of the same, showing the stop shifted laterally (by the sway-bar) for printing capitals or upper case. Fig. 15 is a rear elevation of the rack-bar upon the carriage, the gear normally actuating the carriage in printing, and the spring-wheel, said gear being also adapted to be rotated reversely by the crank-lever to reverse the carriage to set it at any point or throw it back to the beginning of a line of print. Fig. 16 is a side elevation of a lever for projecting a type-bar, the dotted lines showing its position and the position of its parts when swung to project a type-bar. Fig. 17 is a top plan of part of the impression-platen, paper-holder, and scale. Fig. 18 is a vertical longitudinal sectional elevation of the platen, its actuating rack and pawl mechanism, and its stop-pawl mechanism. Fig. 19 is an end elevation of the platen, showing the stop-pawl. Fig. 20 is a sectional detail of the platen, paper-holder, and apron, the dotted lines indicating the paper. Fig. 21 is a detail in top plan of the escapement rack and pawls and the double cams for operating the pawls Fig. 22 is a detail, partly sectional, of the escapement mechanism and the lever for releasing the carriage by lifting the escapement-pawls wholly out of engagement. Fig. 23 is a top plan of the ink-roller and its mounting and means for adjusting the roller vertically. Fig. 24 is a sectional detail of the same on a line transverse to the roller. Fig. 25 is a top plan of part of the bed, the carriage-trackways thereon, the spring-wheel gear, the line-spacing track and switch or cam, and the mechanism for adjusting the switch to vary the line-spacing, the dotted lines indicating the adjustment. Fig. 26 is a transverse sectional elevation of the carriage, its mounting, the paper apron and holder, and the line-spacing mechanism.

In this specification each separate mechanism is described separately, as far as may be, for greater clearness.

A, Fig. 3, is the base; $a$, the table; $b$, the top plate, and $c$ the front, stepped in straight parallel lines, substantially as appears in Fig. 1.

The table is supported above the base in any ordinary manner, and $e$ is a casing inclosing the base and extending up to the table, and the top plate is carried by the vertical walls $h$, Fig. 2, between it and the table. It will be seen that this top plate is segmental in form.

Key-Lever Mechanism, Figs. 3 and 6.

The printing-point upon the platen is the center of the circle. Upon the base a concentric block 2 is secured, vertically and transversely grooved, as a comb, and bored to receive the pivot 3, inserted through the rear ends of the key-levers 4, said comb-grooves being substantially radial to the circle, and the key-levers being thus also substantially radial, Fig. 6. Standards 5 are erected upon the base, and a cross-bar 6, secured thereon, operates to stop the upward or return movement of each lever after it has been depressed. A comb $d$, erected upon said base, guides said levers in their vertical movements. A stem 7, secured to each lever, passes up through the steps of the front plate and carries a finger-button 8, said stems being graduated in length according to said steps, as said levers all lie in the same horizontal plane.

Type-Bars, Figs. 7, 8, and 9.

Each type-bar 9 is alike, except as to the letters, signs, characters, or symbols, of which six are shown upon each one, and comprises a body, upon the rear end of which the type are secured, also provided with lateral shoulders 10 11, also having a mortise 12 adjacent to the front end, either with or without a boss 13, and having its front end upturned and provided with a T-head 14.

It will be seen that three of the type represent small letters and three of them capitals on each bar. It is not deemed necessary to here illustrate or describe the precise arrangement of the punctuation-marks, numerals, and other characters, signs, and symbols, except to say that they are defined and shown in Fig. 1 by the arrangement and grouping of the keys in threes on each side of the space-key bar $m$—as, for instance, the letters V G T constitute one group, and each of the other rows parallel therewith constitutes a group, and on the other side the groups consist of the letters A H Y and the threes parallel to their alignment, and each type-bar represents the letters, signs, characters, symbols, &c., shown by its group, one half in upper case and the other half in lower case—by which arrangement seventy-two letters, &c., are represented by twelve type-bars and thirty-six finger-buttons and key-levers.

Type-Bar Guides, Figs. 3 and 6.

Under the top plate a plate 15 is secured, provided with T slots or grooves exactly radial to the circle, which receive the T-heads of the type-bars and in which they are reciprocated, as hereinafter described, and by which they are guided. They are further guided and held against lateral vibration by means of a comb 16, secured under the rear end of the top plate.

Type-Bar-Reciprocating Mechanism, Fig. 3.

In suitable bearings 17, erected upon the base, angular levers 18 are journaled, the short arms of which bear upward against the lower edge of a key-lever, and the upper end of the other arm fits loosely in the mortise in a type-bar, so that when a key-lever is depressed its type-bar is thrown forward and when released the spring 19 retracts the lever 18, and also brings the key-lever back to its normal position.

Stop Mechanisms, Figs. 3, 10, 11, 12, 13, and 14.

A sway-bar, segmental in outline and comprising a base 20, side rails 21, and a top or table 22, is pivoted upon the table upon a bolt 23 and a set-screw 24 inserted into said bolt. Upon this sway-table a row of stationary stops 25 is secured, Fig. 12, and in front of that are two concentric rows of movable stops 26 27. Each of these movable stops consists of a metallic bar having a flattened head 28, provided with a lateral notch 29 and a shank which is connected to its key-lever, and 30 is a bail under the table and key-levers vertically movable upon its pivot 31 and is depressed by the key-lever, and the spring 32 upon each stop throws it back to its normal position.

The depression of a key-lever, as M in the lower row, draws down the proper stop 27, so that when the type-bar is thrown back the shoulder 10 will strike against the head 28 of that stop, and thus stop said bar with the small letter "m" directly over the printing-point.

When a key-lever of the second row is depressed, the stop 27 remains in its normal position, and the shoulder 10 will pass it and strike against the then depressed stop 26 and the letter "k" will be in proper position to print. Then when a key-lever of the third row is depressed (neither of the stops 26 or 27 will be moved) the shoulder 10 will pass both of them and will strike against the stationary stop 25 and the type-bar will be projected to bring the letter "i" into proper position to print. Each of the type-bars is thus operated by its three key-levers to bring its three rearward characters into position to print, and each is retracted by its spring. It will thus be seen that each of the levers in the lower row is connected to a stop 27, that each of those in the second row is connected to a stop 26, that those of the upper row are not connected to any of the stops 25, and that the stops 26 and 27 are normally in proper position to permit the type-bars to freely reciprocate through the lateral notches, as when a lever in the upper row is operated, so that a shoulder 10 will strike a stationary stop 25, which is the full limit of the stroke of a type-bar. Then the operation of any key-lever in the second row will pull down the stop 26 to which it is connected, and the operation of any lever in the lower row will pull down the stop 27 to which it is connected, and as the levers of the lower row are independent of those in the upper row so the stops 27 are independent of the stops 26, and none of these movable stops are operated except by the operation of the lever to which the particular stop is connected.

The operation of bringing the capitals on the type-bars into printing position is effected by a shift of the stops, hereinafter described, laterally, (see dotted lines, Fig. 12,) and thereafter the stops are respectively engaged by the shoulder 11 in precisely the same manner as they were by the shoulder 10 before the shift was made.

*Stop-Shifting Mechanism, Figs. 3 and 12.*

A key-lever 33 (marked "Caps." in Fig. 1) is secured to a rock-shaft 34, journaled in a bearing 35 under the table, and 36 is a cam-bar secured to said shaft and having its free end in engagement with an arm 37, secured to the bolt 23, so that when this shifting-lever is operated said rock-shaft rotates and raises the cam-bar, which forces the arm 37 rearward and swings said sway-bar laterally and shifts said stops into proper position for the capitals. When this lever is released the spring 38, connected to the arm 37 and to a post 39 upon the base or under the table, throws the sway-bar and shifting-lever back to their normal positions. An arm 40 is secured to said rock-shaft, and the bail 30 is pivotally connected thereto, so when the shifting-lever is depressed the arm 40 is swung rearward and the bail is drawn back, so that the fulcrum of the key-lever thereon is changed rearward or varied, and thus the key-lever is given a greater throw, so as to project the type-bar to its proper position to print either of the capital letters upon it. This variable projection of a type-bar cannot, however, be effected except by the use of a yielding mechanism which will serve a double purpose of permitting the stoppage of the type-bar at any point by any stop, and at the same time permit the key-lever to be depressed the same distance each and every time it is operated in order to secure uniformity of impression whether on a single sheet of paper or in manifolding, as well as of touch or force applied to a button. Hence I have devised the following, which I term my

*Equalizing Mechanism, Figs. 3 and 16.*

The lever 18 consists, as to its long arm, of two sections, the upper section 41 being pivoted at 42 upon the other and provided on its front edge with an arm to which the spring 19 is connected and on its rear edge with a lip 43, which engages with the edge of the lower section when the two sections are in alignment, as shown, and prevents the spring from pulling them out of this relation. Therefore from this it results that where a type-bar is only to be projected a short distance, or to any position short of its full throw for the sixth character, its stoppage for either of the first five of the characters is effected before the key-lever has been depressed far enough to strike a full impression blow, as hereinafter described, and thereupon at each stoppage the key-lever goes right on and the action of the yielding joint in the lever 18 permits the sections to be forced out of alignment, and at the same time the tension upon the spring holds the type-arm firmly in its projected position. A lip 44 can be used to limit this deflection of said sections.

*Impression Mechanism, Figs. 1, 3, and 4.*

An arm 45 is secured to the bail 30, and to it a draw-bar 46 is connected, the upper end of which is connected to the helve 47, which carries the impression-hammer 48. This helve is secured to a shaft 49, journaled in end bearing, as the cone-points 50, in standards 51, erected on the top plate, and 52 represents springs coiled around and tensionally engaging with said shaft or with a sleeve 53 around it and the spring and provided with a thumb-piece 54, ratcheted substantially as shown and engaging with a ratchet upon said hammer-helve, whereby by turning said thumb-piece the tension of said spring is adjusted, said spring aiding torsionally in retracting the hammer after a blow and also in making it a resilient blow.

Inking Mechanism, Figs. 3, 23, and 24.

A shaft 55 is inserted through the walls below the top plate, and arms 56 are secured thereto, each having a notch in its rear end. A rod 57 is also inserted through said walls and is provided with a cam or cams 58, which engage with said arms, and 59 is a spring wound around, secured to, and exerting its torsional force upon said shaft to throw said arms upward and having its free end engaging with the cam-rod. An ink pad or roller 60, of cylindrical form and consisting of a body of felt or other suitable ink-holding material, is secured upon an arbor 61, which has its bearings in said hooks. This ink-roller can be raised or lowered by turning said cam to vary its position with relation to the type or its pressure against them and can be removed by turning the shaft 55, so as to throw its arms down, and said ink-roller can be rotated to present a fresh surface to the type in addition to its normal rotation.

Carriage, Figs. 1, 2, and 26.

Upon the table parallel trackways 62 are secured, grooved longitudinally to receive the balls 63, and 64 and 65 are the carriage-rails, engaging with and having their bearing upon said balls, and these are secured to the caps 66 67, which receive the ends of the platen 68, and 69 is the arbor secured in said caps and upon which the platen is adapted to rotate, Fig. 18. The end cap 66 is solid, Fig. 19, while the cap 67 is bifurcated, Fig. 26, and the rear rail 64 is provided on its lower edge with teeth, Fig. 15, and is the driving-rack.

Carriage-Driving Mechanism, Fig. 15.

Upon the rear of the base a post 70 is erected, upon which an arbor 71 is mounted, and 72 is an ordinary spring-wheel journaled upon said arbor, consisting of a suitable body or case containing a coiled spring, having a cord or band 73, connected to its outer face and adapted to be wound onto said wheel, its other end being connected to and adapted to be wound onto the hub 74 of the gear-wheel 75, which is secured upon a shaft 76 upon the standard 77, erected upon the base. This gear-wheel passes up through a slotway 78, Fig. 25, in the table and engages with said rack-bar, and when printing is being done the step-by-step release of the carriage rotates said gear to unwind the band from its hub and the spring-wheel winds it up, and when the carriage is thrown back the reverse rotation of the gear winds said band onto said hub and off from the spring-wheel, thereby increasing or renewing the tension upon said wheel.

Escapement Mechanism, Figs. 3, 21, and 22.

This is the letter or word spacing mechanism and comprises a rack-bar $m$, secured upon or integral with the front rail of the carriage, a pair of spring-pawls 79, secured upon the table, a double cam 80, secured upon a rock-shaft 81 and engaging or adapted to engage with said pawls, respectively, and a crank-arm 82, engaging with the draw-bar which actuates the impression-hammer, so that whenever a key-lever is struck said cams are rocked, one pawl is raised out of its engagement with the rack-bar, and the other springs down into engagement therewith, and the carriage moves a sufficient distance so that when said key-lever is released the reverse rock of the rock-shaft operates the pawls to restore them to their normal positions and the carriage has traversed the distance of one tooth, and the retaining-pawl is in engagement with the next tooth.

Carriage-Releasing Mechanism, Figs. 1 and 22.

A lever 83 is journaled upon the rock-shaft 84, journaled in its bearings beneath the table, and extends forward to the stem 85 of the finger-button 86, said stem being also engaged by the spring 87 and by an arm extension beyond said rock-shaft extending beyond the table and up above it and provided with a T-head 88. When said lever is depressed, said head engages with both of said pawls and raises them both out of engagement with the rock-bar, and this releases the carriage to be moved in either direction.

Carriage-Shifting Mechanism, Figs. 1 and 3.

The gear-wheel shaft 76 extends forward and is journaled in a standard 89, erected upon the base and provided with a bevel-gear 90, with which a bevel-gear 91 upon the shaft 92 engages, and which shaft extends up through the top plate, and 93 is a combined crank and pointer secured upon said shaft, said shaft being also central to the dial 94, secured upon said top plate, so that when it is desired to shift said carriage back it can be done by simply turning said crank, stopping at any desired point indicated by the figures upon said dial, or when the carriage is released from the escapement-pawls by the lever mechanism before described then said crank can be turned in either direction and the carriage shifted either way and set at any desired point, all from the front of the machine and without touching it.

Line-Spacing Mechanism, Figs. 18, 25, and 26.

A slide 95 is mounted in the trackways upon the table, and 96 is a bell-crank connected to its front end and pivoted on said table and provided with a pin (not shown) adapted to engage with one of the holes 97 in said table and by which said slide is reciprocated and set at any desired point. A switch-bar, consisting of sections 98 99 hinged together, is mounted upon said slide, the sections 98 being secured thereto and the section 99 being connected to the table by the slot-and-screw connection 100, the full lines in Fig. 25 showing the switch set for single spacing, the dotted lines indicating its position for treble spacing, the intermediate hole being used for double spacing.

Upon the end of the platen a crown-ratchet 101 is secured, and 102 is an angular pawl loose upon the platen-shaft, having one arm adapted to engage with said ratchet and the other to engage with said switch and held in such engagement by the spring 103, and when the carriage approaches the end of a line of print said spring causes the pendent arm of said pawl to follow the switch incline, and thereby shift the other arm into engagement with another tooth of the ratchet, either the next one or the second or the third, according to the set of the switch, and then when the carriage is reversed said switch incline operates as a cam to swing said pawl and rotate the platen. All this is performed automatically and can be done by shifting the carriage back by the crank mechanism before described, either with or without releasing the carriage from the escapement-pawls by the lever mechanism before described.

*Platen-Stops, Figs. 18 and 19.*

Upon the end of the platen, at the right of Fig. 18, is a crown-ratchet 104, having V-teeth, and 105 is a pawl secured to the cap 66 and having a spring-arm 106, provided with a V-tooth, which engages with said ratchet, and when the platen is intentionally rotated, as aforesaid, said pawl-tooth will snap from one ratchet-tooth to another, and when the rotation ceases said pawl will prevent any accidental rotation.

*Paper Guide and Apron, Figs. 20 and 26.*

The paper-guide 107 consists of a piece of sheet metal, of substantially the form shown in Fig. 20, inserted through under the platen and curving up in front of it and close to it and provided with an upturned lip 108, which guides the edge of the paper which is inserted from the rear of the platen.

*Paper-Holder, Figs. 17, 20, and 26.*

This consists of a frame comprising a front rod 109, journaled in ears 110 upon the end caps of the platen, a roller 111, journaled upon said rod, end bars 112, each provided with a cam-lug 113, which engages with an end cap, a bail-rod connecting the rear ends of said arms, and torsion-springs 114 upon the front rod and connected thereto and also engaging with said ears or with an arm 115 thereon, whereby when said frame is tilted said roller is thrown away from the platen for the introduction of the paper and is then snapped down by said springs, bringing the roller against the paper and yieldingly gripping it against the platen, while the rear rod folds the paper down over the platen. A scale 116 is also mounted upon said frame and is raised from or brought back to the paper by this swing of said frame.

It will be readily seen that a brush can be inserted in place of the ink-roller and held, as by hand, against rotation, and then by operating the several key-levers the type can be easily cleaned, said brush being provided with a central shaft, the same as said roller.

It will also be seen that from the arrangement of the key-levers in groups of three there will be only one angular lever 17 for each group and that either key-lever in a group will operate it independently of the others, and that while normally said lever supports its group when one key-lever is operated the other two must be supported. The springs 32 perform this function by holding the stops which are not operated up in their normal positions; also, that when a key-lever in the third row is operated two of that group must be supported, and for that purpose I connect to each of the third-row levers a lever-stop (see dotted lines marked 117 in Fig. 3) like unto the type-bar stops, except that they have no heads and only abut against the top of the sway-bar, springs being provided like unto those upon the stops and operating in the same way to support the key-levers.

*Margin-Regulating, Figs. 1 and 2.*

In a standard 118, erected upon the table, an annularly-grooved rod 119 is journaled transversely and having an angular point 120, which is adapted to engage with a stop 121 on the carriage-rail. 122 is a set-screw provided with a point adapted to engage with one of said grooves to hold said rod. When the set-screw is tightened, said rod can still be rotated to throw the point away from the carriage, as for margin-printing, or when the set-screw is loosened it can be traversed in said standard to vary the margin and set at any point by said set-screw.

In Fig. 5 I show the means for yieldingly supporting a type-bar forward of the plate 15, consisting of a tappet-pin 123, inserted into the top 22 of the sway-bar and provided with a spring 124 and a shoulder 125, engaging with a plate 126 upon the top plate, whereby said bar is not only yieldingly carried, but when the hammer strikes an impression blow upon a type-bar said tappet will be depressed, and when said hammer is retracted said type-bar will be raised back to its normal position.

Having described my invention, what I claim, and desire to secure by Letters Patent, is—

1. In a type-writing machine, horizontally reciprocating type-arms, each provided with a T head, in combination with a guide plate provided with T grooves receiving said heads, and in which they reciprocate, and means to reciprocate them.

2. In a type-writing machine, horizontally reciprocating type-arms, each provided with a T head, in combination with a guide plate, provided with T grooves receiving said heads and in which they reciprocate, and means to reciprocate them, and a guide comb through which said bars reciprocate.

3. The combination with key-levers arranged in groups of three, and a single angular lever engaging with them, and adapted to be operated by them separately, of a single type-bar for each group, provided with multiple type and adapted to be projected by either key levers independently of the others in the group to bring a given type into printing position.

4. The combination with the key-levers arranged in groups of three, and an angular lever normally supporting all of them, and adapted to be operated singly and independently of the other members of the group, and means to support the key-levers not operated while one is being operated; of a single type-bar for each group provided with several type and adapted to be projected variable distances to bring each type into the printing position.

5. The combination with a reciprocating type-arm, of a tappet yieldingly supporting it, and a vibratory impression hammer, and means to operate it.

6. The combination with a group of key-levers, of an angular lever common to all of them and adapted to be operated by either independently of the others and a single type-bar for each group, provided with a multiple type and adapted to be projected variable distances by said key-levers separately to bring the type into their respective printing positions; of a set of stops for each group of key-levers, part of said stops being rigid and not connected to the key-levers they represent and the others being directly connected to and operated vertically by the key-levers they respectively represent with which said type-bars engage when projected.

7. A group of key-levers, an angular lever common to all of them, a multiple-type type-bar reciprocated longitudinally by said lever by the operation of either key-lever of the group, in combination with a series of stops normally out of engagement with said type-bar and adapted to be shifted to cause engagement of the type-bar by the stop which represents the key-lever which is operated.

8. A group of key-levers, an angular lever common to all of them and consisting of sections hinged together, in combination with a type-bar engaged by said angular lever and reciprocated by it variable distances by said key-levers, according to which one is operated.

9. A group of key-levers, an angular lever common to all of them and consisting of sections hinged together, in combination with a type-bar engaged by said angular lever, and reciprocated by it variable distances by said key-levers according to which one is operated, and stops with one of which said type-bar engages when a key lever is operated.

10. A group of key-levers, an angular lever common to all of them and consisting of sections hinged together, and a type-bar adapted to be reciprocated by said angular lever, when any one of said key levers is operated, in combination with a group of stops complementary to the levers of a group respectively, whereby said type-bar engages with the stop representing the key lever operated.

11. A group of key-levers, a sectional angular lever common to all of them, and a reciprocating type-bar actuated by either of said key-levers independently of the others in the group, in combination with a group of stops complementary to the respective key-levers of a group, whereby said type-bar engages with the stop representing the key-lever operated, and an impression hammer actuated to strike said type-bar by the operation of a key-lever.

12. A key-lever, and a reciprocating type-bar, in combination with an angular lever connected to said type-bar and in engagement with said lever, and consisting of sections connected together and normally in alignment, and adapted to be thrown out of such alignment whenever a key-lever is operated.

13. A key-lever, a reciprocating type-bar, and a stop for said type-bar, in combination with an angular lever connected to said type-bar, and engaged by said lever, and consisting of sections normally in alignment, and adapted to be thrown out of such alignment whenever a key-lever is operated, and said type-bar strikes said stop.

14. A key-lever, a reciprocating type-bar, and a stop for said type-bar, in combination with an angular lever connected to said type-bar, and engaged by said lever, and consisting of sections normally in alignment, and adapted to be thrown out of such alignment whenever a key-lever is operated, and said type-bar strikes said stop, and an impression hammer actuated by said key-lever.

15. A group of key-levers, a reciprocating type-bar provided with type representing them and a series of stops representing said levers, in combination with an angular lever connected to said type-bar and in engagement with the key-levers of said group, and consisting of sections normally in alignment, and adapted to be thrown out of such alignment by the operation of a key-lever and the stoppage of the type-bar by one of said stops.

16. A group of key-levers, a reciprocating type-bar provided with type representing them and a series of stops representing said levers, in combination with an angular lever connected to said type-bar and in engagement with the key-levers of said group, and consisting of sections normally in alignment, and adapted to be thrown out of such alignment by the operation of a key-lever and the stoppage of the type-bar by one of said stops and an impression hammer actuated by said key-lever.

17. In a type-writing machine, the combination with a top-plate, a traversing carriage and a rack-bar upon the rear side thereof, of a shaft journaled under the top-plate and at a right angle to the rack-bar, a gear upon said shaft engaging with said rack-bar, a spring wheel, a cord connected to it and to the hub of said gear, and adapted to be wound from one onto the other and means to rotate said gear and thereby traverse said carriage and vary the tension of the spring wheel.

18. In a type-writing machine, the combination with a top-plate, a traversing carriage, and a rack-bar upon the rear side thereof, of a shaft journaled under the top-plate and at a right angle to the rack-bar, a gear upon said shaft engaging with said rack-bar, a spring wheel, a cord connected to it and wound thereon and to the hub of said gear and adapted to be wound from one onto the other, a dial upon the front of the machine and to which said shaft is central and means to rotate said shaft from the front of said dial, and traverse said carriage and vary the tension of the spring wheel.

19. In a type-writing machine, the combination with the impression platen journaled in a traversing carriage and the ratchet thereon, of a pawl mounted upon the platen arbor and engaging with said ratchet, and a jointed switch having an inclined face for a portion of its length and a continuation in line with the traverse of the carriage for the remaining portion, with which an arm of said pawl engages to rotate the platen for line spacing when the carriage is thrown back.

20. In a type-writing machine, the combination with the impression platen journaled in a traversing carriage, and the ratchet thereon, of a pawl mounted upon the platen arbor and engaging with said ratchet, and a jointed switch having an inclined face for a portion of its length and a continuation in line with the traverse of the carriage for the remaining portion, with which an arm of the pawl engages, to rotate the platen for line spacing when the carriage is thrown back and means to vary the inclination of the face of said inclined face and adjust the line spacing.

21. In a type-writing machine, the combination with a traversing carriage and a rack-bar thereon, of a gear engaging said rack, a shaft actuating said gear, a bevel-gear on the front end of said shaft, a vertical shaft provided with a bevel gear engaging said other bevel gear, and a crank upon the latter shaft, a pointer thereon and a dial upon the top-plate.

22. In a type-writing machine, the combination with a type-bar adapted to be reciprocated, of a stop normally out of engagement therewith and adapted to be lowered simultaneously with the forward movement of the type-bar to stop the same at the proper point, and remain lowered until said bar is retracted.

23. In a type-writing machine, the combination with a reciprocating type-bar carrying upper and lower case type, of a sway-bar pivotally mounted and means to shift it laterally to change it from one case to the other.

24. In a type-writing machine, the combination with a reciprocating type-bar provided with upper and lower case type, of a sway-bar pivotally mounted and adapted to be shifted laterally, and a series of stops mounted therein with which the type arm engages both before and after the sway-bar is shifted.

In witness whereof I have hereunto set my hand this 25th day of September, 1894.

LUCIEN S. CRANDALL.

In presence of—
C. W. SMITH,
HOWARD P. DENISON.